April 18, 1939.                V. C. BOYDSTON                2,154,659
                                 PRIMER VALVE
                               Filed Oct. 8, 1938
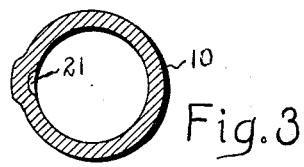
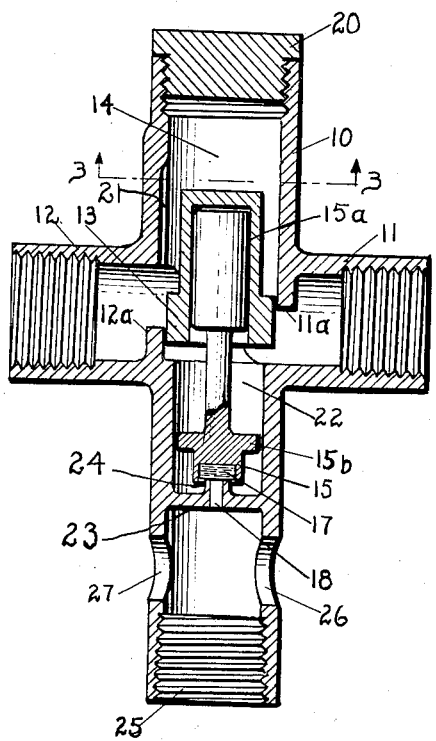
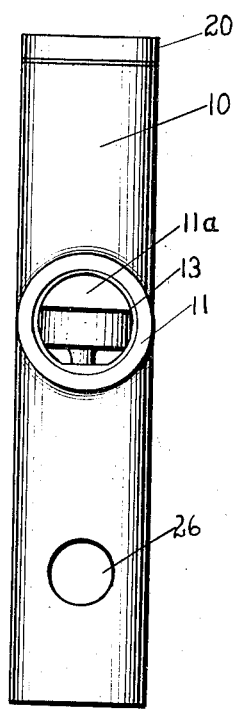
Verne C. Boydston
                                           INVENTOR.

Patented Apr. 18, 1939

2,154,659

UNITED STATES PATENT OFFICE 2,154,659

PRIMER VALVE

Verne C. Boydston, Seattle, Wash.

Application October 8, 1938, Serial No. 233,981

4 Claims. (Cl. 182—12)

My invention relates to automatic primer valves and more especially to automatic valves as used for the purpose of supplying or diverting a very small proportion of the water passing through a main or branch supply pipe for the purpose of maintaining the level of water seal in the trap of a floor drain.

Floor drains and other drains connected to a sewer are commonly provided with a trap designed to provide a water seal against the return of sewer gas. The preventive value of such a trap depends upon the maintenance of the water level in the trap. This seal water may be lost by evaporation, when the drain has not been used for a period of time; or the seal water may be syphoned out by a developed fault in the building sewage and vent system.

The objects of my invention are,

To provide a valve having a comparatively large, valved discharge aperture which will not be easily stopped up by debris or sediment as might be the case in a valve in which the discharge aperture was made very small or restricted by other means in order to provide a small discharge of water;

To provide a valve which, upon operating to discharge water to a trap by reason of water usage through its main passage, will open its discharge valve widely and then close the same positively after a short time interval regardless of the length of time that water is being used;

To provide a valve having the foregoing features and in which also the duration of opening of the discharge valve will be inversely proportional to the supply pressure so that the amount of water discharged to the trap will be practically independent of the supply pressure;

To provide a valve which will operate to discharge water to a trap upon the first usage of water from a pipe served through the valve, but which will remain inoperative to subsequent usage until after a given time has elapsed after the cessation of use, thereby conserving water which would be unnecessarily discharged by a valve which is operative to every usage;

To combine in a valve as described above a minimum of simple, rugged parts as will not easily wear or get out of adjustment.

I accomplish the foregoing by means of the construction and principles described below and which are illustrated in the accompanying drawing, in which—

Fig. 1 is a sectional elevation of the valve taken on the longitudinal center-line, Fig. 2 is a side elevation, and Fig. 3 is a section taken along the line 3—3 of Fig. 1.

A valve body 10, of hollow cylindrical form, has its upper portion smoothly bored as a cylinder 14 to accommodate a piston 13 slidable vertically therein. The upper end of said body is closed by a pressure tight, screw-threaded cap 20. An inlet connection 11 and an outlet connection 12, integral with said body, are screw-threaded to accommodate pipe conduits and open into the cylinder 14. A portion of the wall of the cylinder 14 extends downwardly into the inlet 11, as indicated at 11a, and a like portion 12a extends upwardly into the outlet 12. The foregoing arrangement constitutes an offset passage through said cylinder and causes the piston 13 to be forced upward within said cylinder upon the passage of liquid therethrough.

A by-pass port 21, in the form of a groove formed in the wall of the cylinder 14, extends downwardly from a point above the highest point of travel of the piston 13 and merges into the outlet 12 and thereby provides an outlet for liquid from the blind upper end of said cylinder so that said piston will not be blocked in its upward travel.

That portion of the body 10 below the inlet 11 and outlet 12 is bored to a smaller diameter than the cylinder 14, opens into said cylinder and is closed at its lower end by a partition 23 to form a cylinder 22. The partition 23 is formed with an inwardly raised, circular, concentric boss which is pierced axially with an aperture 18 to form a discharge valve seat 24.

It is not essential to the operation of the device that the lower cylinder 22 be of lesser diameter of bore than the upper cylinder 14. One continuous cylinder of uniform bore would suffice, providing that the parts were correspondingly proportioned. In the practical construction of such a valve, the cylinder 14 is made of such a diameter that the area of the transverse passage from the inlet 11 to the outlet 12 through the said cylinder will be greater than the area of the supply pipe, thus minimizing the friction loss. Were this diameter of cylinder continued downwardly to the discharge valve seat 24, it would result in unnecessarily large and cumbersome construction.

The extreme lower end of the body 10 is open downwardly and is screw-threaded at 25 to accommodate a pipe conduit to conduct the discharge to a drain trap. The barrel portion of said body between the outlet 25 and the partition 23 is provided with opposite openings 26 and 27, preferably in line, to make visible the flow of liquids from the aperture 18 and also to admit air and thus preclude the possibility of back-syphoning of liquid from the drain trap, should such syphoning tend to occur when the supply line is drained.

The piston 13 is concentrically hollow bored and open at its lower end to form a dash-pot cylinder to accommodate a piston 15a formed at the upper end of a valve member 15. Said valve member comprises the piston 15a, a stem of smaller diameter, a circular flanged portion 15b, adjacent the lower end, and a recess 15c at its lower end to receive a composition valve disc 17 co-operating with the valve seat 24. The diameter of the flange 15b, with reference to the bore of the cylinder 22, is such that the annular space between the said parts has an area equal to or slightly greater than the area of the aperture 18.

The upper end of the valve member 15 is guided centrally by the co-operation of the piston portion 15a with the bore of the piston 13 and the lower end is similarly guided by the flange portion 15b in cylinder 22, so that said valve member may travel vertically in said cylinder and the valve disc 17 will register with the valve seat 24 when said valve is at the lowest point of its travel.

The proportions of the respective lengths of the cylinder 22, the cylinder 14, the piston 13 and the valve member 15 and its piston 15a must be such that when the said valve member is in its normally closed position and the piston 13 is at its highest point of travel, the piston 15a will be engaged with the bore of piston 13. Likewise, when both members are in the position of extreme upward travel, the flange portion 15b will be within the bore of the cylinder 22.

With the valve connected with the inlet 11 to a source of water under presure, the outlet 12 to a faucet or other water-consuming device and the discharge connection 25 through a gravity pipe line to a trap, and with no water flowing through the valve, the piston 13 and the valve member 15 will be held by gravity in their respective lower positions and the water pressure will press the valve disc 17 against the seat 24 so that no water will discharge from the aperture 18. When a faucet in the line of the outlet 12 is opened, the pressure on the discharge side of the piston 13 is reduced below that of the inlet side and water entering the cylinder 14 below said piston will force it upward so that water may flow through the valve. Upon the initial upward movement of the piston 13, the valve member 15 will be drawn upward with said piston by the suction of the piston 15a in the bore of the piston 13, opening the discharge aperture, and water will flow through the cylinder 22, past the flange 15b and out said aperture 18, into the pipe line to the trap.

Owing to the restriction to flow through the cylinder 22, offered by the narrow annulus around the flange 15b, the pressure above said flange will be greater than that below it and a downward force will be exerted tending to withdraw the piston 15a from the bore of the piston 13. If water continues to flow through the valve from outlet 12 and the piston 13 is thereby held in its raised position, the valve member 15 will descend slowly by reason of the force previously mentioned to close the discharge from the aperture 18. If the faucet should be closed immediately after opening, both members, the piston 13 and the valve 15 will rise and descend without change of position relative to each other.

The length of time during which the valve 15 will remain in open position is determined by the closeness of fit between the piston 15a and the bore of the piston 13, the clearance between the flange 15b and the cylinder 22 and also by the supply pressure. Closer fit of the first mentioned will increase the time; closer fit of the second will decrease the time; and higher supply pressure will decrease the time. The first two factors are determined in the manufacture of the valve and are so proportioned as to allow a discharge time to the trap of from one-half to one second at a pressure of forty pounds per square inch.

When the faucet is closed, the pressure throughout the valve is equalized and gravity will tend to force the piston 13 downward. The water in the bore of the piston 13 above the piston 15a must flow out past that piston 15a and the water in the lower end of the cylinder 14 below the piston 13 must be displaced to the upper end of said cylinder as the piston 13 descends. The clearances between the above mentioned parts are designed so that it will require from one to two minutes for the piston 13 to travel from its raised position to its lower position after water has ceased to flow through the valve.

It may be seen that, due to the length of time required for the piston 13 to descend from its raised position, if water is drawn intermittently from a faucet and at close intervals, as is frequently the case, the valve will function to void water to the trap only upon the initial opening of a faucet for such use and will not have descended far enough to lift the valve 15 if such subsequent openings of the faucet are closely following. It is also evident that the amount of water voided to the trap per operation of the valve will be almost independent of the supply pressure because if the pressure is high and, consequently, the quantity per second flow through the aperture 18 is high, the time of opening of the valve will be short due to the greater force acting to close the valve. Conversely, with a low water pressure, decreased velocity of flow and longer time will result in an approximately equal amount of water discharged.

The arrangement of the partition portions 11a and 12a and the reduced diameter of the stem portion of the valve member 15 are such that very little obstruction to the direct flow of water through the valve is offered, with consequently very low pressure drop.

It is understood that I have illustrated one of the simple embodiments of the principles of my invention for the purpose of describing the same and that variations in form and construction may be made as will lie within the following claims.

Having thus fully described my invention, the manner of its use and the advantages due to its use, what I claim as new and desire to secure by Letters Patent, is:

1. In a primer valve, having an inlet and an outlet connection, valve means for discharging water to a trap and means for opening said valve upon the passage of water through said inlet and outlet, a dash-pot connecting means between said valve and said opening means.

2. In combination in a primer valve, a body having main inlet and outlet connections, a cylinder interposed and communicating therewith, said cylinder having a closed upper end and a valved outlet at its lower end, a piston adapted to slide within said cylinder, said piston normally obscuring said main outlet and opening same upon the passage of liquid therethrough, a valve co-operating with said valved outlet to normally close the same, and a dash-pot connection between said piston and said valve.

3. In combination in a primer valve, a body having a main inlet and outlet connection, a cylinder interposed having a closed upper end and a valved outlet at its lower end, said cylinder communicating with said inlet and outlet connections, a piston adapted to slide within said cylinder, normally obscuring said outlet and opening same upon the passage of liquid therethrough, a valve for said lower outlet having a flanged enlargement thereof, loosely fitting the bore of said cylinder, and dash-pot connecting means between said piston and said valve.

4. In combination in a primer valve, a body having a main inlet and outlet connection, a cylinder interposed having a closed upper end and a valved outlet at its lower end, said cylinder communicating with said inlet and outlet connections, a piston adapted to slide within said cylinder, normally obscuring said outlet and opening same upon the passage of liquid therethrough, a valve for said lower outlet having a flanged enlargement thereof, loosely fitting the bore of said cylinder, dash-pot connecting means between said piston and said valve, and a by-pass connecting the closed upper end of said cylinder with said main outlet.

VERNE C. BOYDSTON.